Jan. 25, 1966 J. P. SWEENEY ETAL 3,231,873

BI-DIRECTIONAL MAGNETIC CORE SHIFT REGISTER

Filed May 10, 1961 2 Sheets-Sheet 1

INVENTORS
JOSEPH P. SWEENEY
JOHN C. MALLISON
BY WILLIAM K. ENGLISH
Curtis, Morris & Safford
ATTORNEYS.

BI-DIRECTIONAL MAGNETIC CORE SHIFT REGISTER

Filed May 10, 1961 2 Sheets-Sheet 2

INVENTORS:
JOSEPH P. SWEENEY
JOHN C. MALLINSON
BY WILLIAM K. ENGLISH
Curtis, Morris & Safford
ATTORNEYS.

3,231,873
BI-DIRECTIONAL MAGNETIC CORE SHIFT REGISTER

Joseph P. Sweeney and John C. Mallinson, Harrisburg, Pa., and William K. English, Menlo Park, Calif., assignors to AMP Incorporated, Harrisburg, Pa.

Filed May 10, 1961, Ser. No. 109,057
7 Claims. (Cl. 340—174)

Figure 1A:
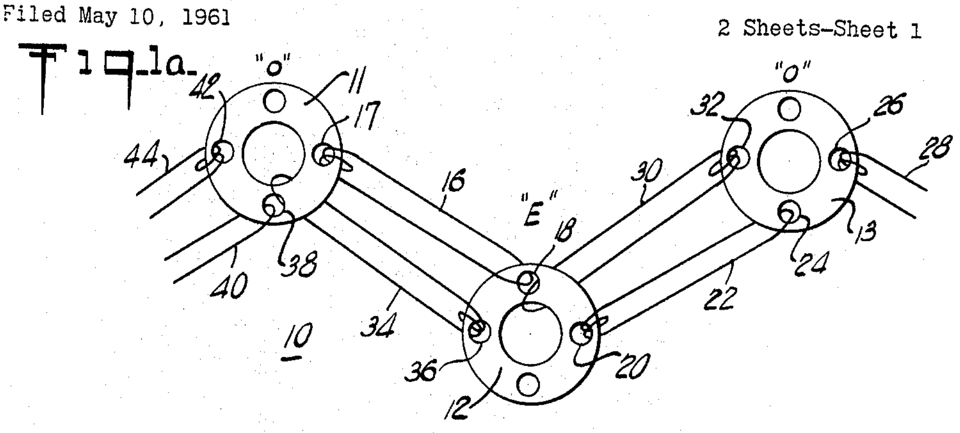

This invention relates to bi-directional shift registers, and more particularly to such registers using multi-aperture magnetic cores.

An object of this invention is to provide a magnetic core shift register which operates efficiently in either direction and which is easily controlled for shifting information first in one direction and then in the other, as desired.

Another object is to provide a shift register of this kind which is very reliable yet relatively simple and inexpensive to manufacture.

A further object is to provide such a shift register which is compatible with drive equipment normally used with a uni-directional magnetic core shift register.

These and other objects will in part be understood from and in part pointed out in the description given hereinafter.

A magnetic core shift register is a device wherein a sequence of binary ones and zeroes are stored in the form of magnetic fluxes in a series of small magnetic cores. Each core is connected to the next and by energization of the cores in sequence with appropriate drive currents, the flux stored in one core is shifted to the next, and so on. Now, to prevent the destruction of the information stored in the cores while flux is being shifted from one core to the next it is necessary to couple the cores in such fashion that flux can only be shifted in one direction. Normally, therefore, such a register is uni-directional in its operation.

In a co-pending application, now U.S. Patent 2,995,731, there is disclosed a shift register using multi-aperture magnetic cores (MAD cores) connected in series with each other so that the transfer of magnetic flux is inherently only from a transmitting to a receiving core and never the reverse. The present invention provides a shift register of this general type which has essentially the same operating characteristics and ranges but which is bi-directional. This permits the register to shift the information stored in it either right or left on command, a dual capability of this kind being useful in computers and various other types of equipment.

In accordance with the invention in one specific embodiment thereof, there is provided a priming type of shift register having a number of MAD cores connected one to the next by respective coupling loops, there being between each two cores one coupling winding for left to right transfer of flux, and another similar winding for right to left transfer. The left to right windings are associated with corresponding transmit and receive minor apertures of the cores, whereas the right to left windings are associated with different transmit and receive minor apertures of the respective cores, the left to right and right to left sets of windings being placed on the cores so that they do not interfere with efficient operation or shifting of information in the register in one direction or the other. In conjunction with the two sets of coupling windings, the cores of the register are also threaded with two priming windings, one of which controls left to right shifting of flux and the other, right to left shifting. By energizing one or the other of these prime windings (but not both at once) and by driving the cores with properly proportioned and timed advance currents, information can be shifted either left or right along the register. As will appear, the additional wiring in this new bi-directional register is relatively simple and the register is able to operate effectively under the same conditions and using the same drivers as a uni-directional register such as described in the aforesaid patent application.

In a second embodiment of the invention a single set of coupling windings is used for shifting in either direction depending upon which prime winding is energized.

Figure 1B:
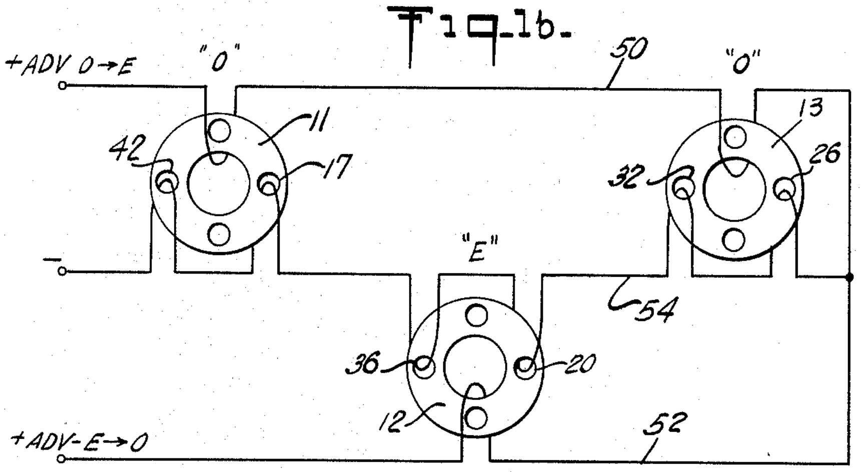
Figure 1C:
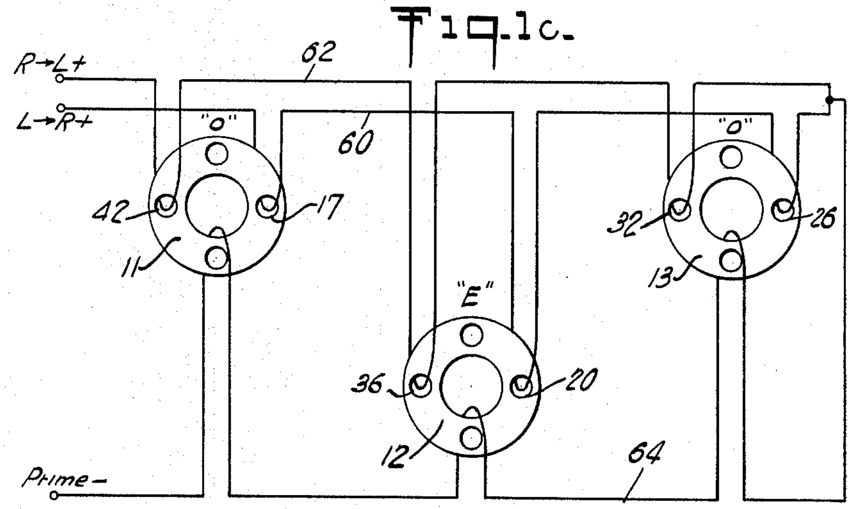
Figure 2:
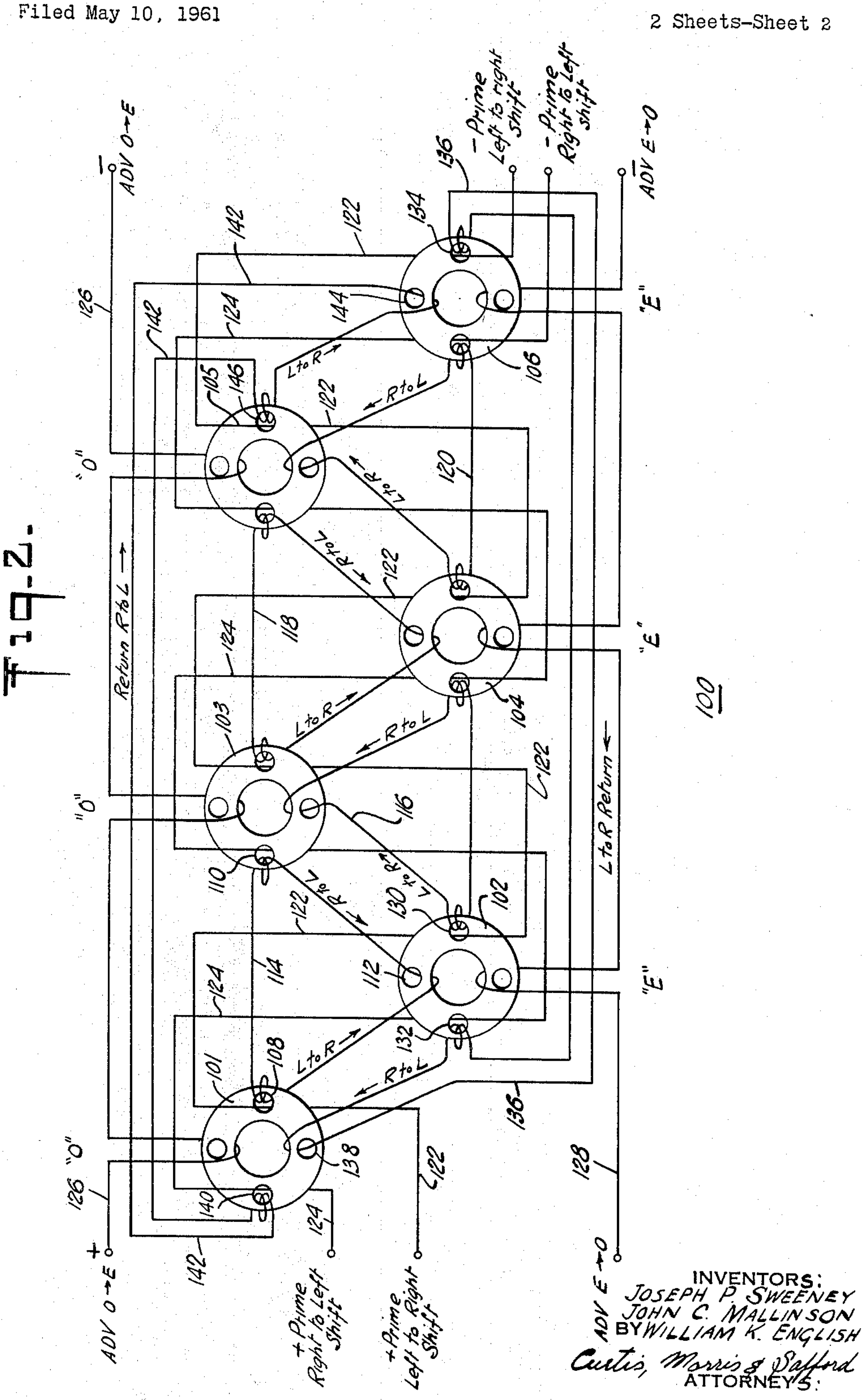

A better understanding of the invention together with a fuller appreciation of its many advantages will best be gained from the following description given in connection with the accompanying drawings wherein:

FIGURES 1*a*, *b*, *c*, are a schematic circuit of one embodiment of a bi-directional shift register according to the invention, FIGURE 1*a* showing the two sets of coupling windings on the cores, FIGURE 1*b*, showing the advance drive windings, and FIGURE 1*c*, showing the two prime windings; and FIGURE 2 is a schematic circuit of a second embodiment of the invention, all of the windings on the cores being shown in this single figure.

The shift register 10 in FIGURE 1 has its various windings shown separately in parts *a*, *b* and *c* for the sake of clarity. It will be understood of course that in the actual unit these windings are all superimposed on the cores. This shift register comprises a first or odd numbered O core 11, followed by an even E core 12, which in turn is followed by another O core 13, and so on, for as many cores as are in the register. As seen in FIGURE 1*a*, O core 11 is connected to E core 12 by a left to right coupling winding 16, two turns of this winding threading a minor output aperture 17 of core 11 and one turn threading a minor input aperture 18 of E core 12 in the senses shown. Similarly, E core 12 is coupled through a minor output aperture 20 by means of another left to right coupling winding 22 to a minor input aperture 24 of O core 13. The latter core at a minor aperture 26 has an output winding 28, which, if desired, can comprise the coupling winding to another core (not shown).

Going now from right to left, O core 13 is coupled to E core 12 by a winding 30 which threads a minor output aperture 32 of O core 13 and minor aperture 18 of E core 12. It will be noted that this winding also passes through the major aperture of E core 12 so that it encircles the inner leg of the core at minor aperture 18. Winding 16 previously mentioned encircles the outer leg of the core at this aperture. E core 12 is in turn connected to O core 11 by a winding 34 similar to winding 30. Winding 34 threads a minor output aperture 36 of E core 12 and a minor aperture 38 of O core 11 as well as the major aperture of this core. Threading the outer leg of minor aperture 38 of O core 11 is an input winding 40, which like winding 22 may extend to another core in the register or to an input signal source (not shown). O core 11 at a minor aperture 42 has an output winding 44 which like winding 30 may extend to another core in the register.

The sets of coupling windings described thus far are placed on the cores in the senses shown. Assuming that the clear or zero state of the cores is saturated with flux in the clockwise direction, then for example, when the flux in the outer leg of O core 11 at aperture 38 is reversed, or driven clockwise a "one" is said to be set into the core. The setting of this "one" in turn causes the reversal of flux in the inner leg of the core at aperture 17, the outer leg still having its flux clockwise. Now, by reversing the flux locally around aperture 17 to drive the outer leg flux counter-clockwise and the inner leg flux clockwise, this aperture is "primed." Thereafter when the core is entirely cleared, i.e., again saturated with clockwise flux, the flux in the outer leg of the core at aperture 17 is reversed. This generates a current in coupling winding 16, the direction of this current being such that flux in the outer leg of core 12 at aperture 18 is reversed or driven counter-clockwise. In this way a "one" previously stored in O core 11 is transferred to E core 12.

In this priming type of register, unless a minor aperture has been primed there cannot be a reversal of flux in the outer leg of the core at this aperture and hence no current will be generated in the output coupling loop encircling this leg (e.g. winding 16) when the core is cleared.

FIGURE 1*b* shows an advance O to E drive winding 50 and an advance E to O drive winding 52 threading various apertures of the cores of the register. These windings have a common portion 54 which threads certain minor apertures of the cores and whose purpose, as is known, is to apply a holding magnetomotive force about these apertures when the main apertures, respectively, are driven with advance O to E or advance E to O current pulses to clear the cores.

FIGURE 1*c* shows the prime windings which thread the cores of the register. These windings comprise a left to right prime winding 60 which passes through minor aperture 17 of core 11, minor aperture 20 of core 12 and minor aperture 26 of core 13. These apertures comprise the left to right transmitting minor apertures of the cores of the register. A second, right to left prime winding 62 threads minor apertures 32, 36 and 42, these being the right to left transmitting apertures. Prime windings 60 and 62 have a common portion 64 which threads the major apertures of the cores and, as is known, helps prevent false operation because of excessive priming currents. The ratio of turns through the minor apertures to turns through the major apertures is, for example 3 to 1.

With a cycle of energization of set, prime, advance O to E, prime, advance E to O, prime, and so on, when prime winding 60 is energized, information will be shifted left to right in the register, as explained above. On the other hand, when prime winding 62 is energized, information will be shifted right to left. Thus, simply by externally switching direct current to one or the other of these prime windings, the register can be operated in either direction. It will be noted that only three of the four minor apertures of each core of the register are threaded by the windings shown. This leaves the fourth aperture available for parallel readout, if desired. With the arrangement of coupling windings shown in FIGURE 1*a*, there is very little loading or magnetic interaction between one set of windings and the other. Moreover, there is no interaction between the two priming windings. Thus, shift register 10 has effectively the same operating ranges of prime and drive currents in each direction as the ranges for the unidirectional shift register described in the above-mentioned patent application.

FIGURE 2 shows another embodiment of the invention. Here all of the windings of register 100 are shown superimposed upon the cores. This register includes O cores 101, 103, and 105, and E cores 102, 104, and 106. Now, instead of two separate coupling windings connecting each two cores, unique triangular windings, respectively, connect each three adjacent cores. Thus, O cores 101 and 103 and E core 102 through their respective minor apertures 108, 110, and 112 are threaded by a coupling winding 114. The turns ratios and winding senses of this winding are as shown. Similarly, other groups of three cores are coupled by windings 116, 118 and 120, respectively, their turns ratios and winding senses also being as shown.

Aperture 108 of O core 101 comprises its left to right transmitting aperture, whereas aperture 110 of O core 103 is the right to left transmitting aperture. On the other hand, aperture 112 of E core 102 is the receiving aperture for either direction of shifting. Now, it will be seen that the right-hand or left to right minor transmitting aperture of each O and E core is threaded by a first or left to right prime winding 122. Similarly, each left-hand or right to left transmitting aperture of the O and E cores is threaded by a right to left prime winding 124. None of the receive apertures is threaded by either prime winding. Furthermore, the major apertures of the O cores are threaded by an advance O to E winding 126, and the major apertures of the E cores threaded by an advance E to O winding 128.

Assuming that core 101 has been set with a one, and that its minor aperture 108 primed by suitable current applied to winding 122, then with the next advance O to E current pulse, current will be generated in coupling winding 114. The sense of this current will be such as to set a one into E core 102 by reversing the flux (i.e. driving it counter-clockwise) in the inner leg at aperture 112. This current flowing in coupling winding 114 also tries to set a one into O core 103, but at this instant this core is being cleared by the advance O to E pulse and, therefore, current in winding 114 is unable to set a one into O core 103.

The setting of a one into E core 102 sets up a locally circulating flux around each of its minor apertures. But before a one can be transmitted from such an aperture, the flux must be primed. Thus, since prime winding 122, and not prime winding 124, is now assumed to be energized, only the right hand minor transmitting aperture, designated by numeral 130, of E core 102 will be primed. The left hand aperture 132 will not be primed. Thus, when E core 102 is cleared by the next advance E to O current pulse, a current will be generated in coupling winding 116 and a one transmitted to O core 103. In this fashion information is shifted left to right from one core to the next. If prime winding 124, instead of winding 122, were energized, information would be shifted right to left.

To transmit information from the end E core 106 back to beginning O core 101 of the register, the right-hand transmitting aperture 134 of E core 106 is threaded by a coupling winding 136 which also threads the left-hand transmitting aperture 132 of E core 102 and the receiving aperture 138 of O core 101. This coupling winding also serves for the right to left transmission from E core to O core 101. In a similar fashion O core 101 through its left-hand transmitting aperture 140 is connected by means of a coupling winding 142 to the receiving aperture 144 of E core 106 and to the right-hand transmitting aperture 146 of O core 105. To set information into either end of register 100, suitable input windings (not shown) can be threaded through the unused minor aperture of O core 101 and of E core 106.

It will be noted that the coupling windings in register 100 are more nearly symmetrical than the coupling windings of register 10 and that only one set of windings is required.

The above description is intended in illustration and not in limitation of the invention. Various changes in the embodiments illustrated may occur to those skilled in the art and can be made without departing from the spirit or scope of the invention as set forth.

What is claimed is:

1. An improved magnetic core shift register which can be operated in either direction, said register comprising a plurality of multi-aperture magnetic cores, each core having a major aperture, a left-hand transmitting minor aperture and a right-hand transmitting minor aperture, a first prime winding threading the right-hand minor apertures of the cores in the register, a second prime winding threading the left-hand minor apertures of the cores in the register, said prime windings being adapted to be independently energized, advance drive windings respectively threading the major apertures of said cores, and coupling winding means connecting a right-hand transmitting aperture of a core to the next core to the right in the register, and connecting a left-hand transmitting aperture of a core to the next core to the left in the register, whereby energizing one or the other of said prime windings information can be shifted right or left in the register.

2. The register in claim 1 wherein said coupling winding means comprises between each two adjacent cores a first left to right winding, and a second right to left winding, each winding going from a transmitting aperture to a receiving aperture.

3. The register in claim 1 wherein said coupling winding means comprises a triangular winding linking a left-hand transmitting aperture of a first core to a receiving aperture of a second core and a right-hand transmitting aperture of a third core.

4. A bi-directional multi-aperture magnetic core shift register comprising a plurality of cores arranged in odd and even groups, each core having a first and a second transmitting minor aperture and a receiving aperture, advance drive means for clearing the odd cores then the even cores and so on, first means for priming the first transmitting apertures of the cores, second means for priming the second transmitting apertures of the cores, and coupling loop means respectively connecting a first transmitting aperture of one core in one group to a receiving aperture of a core in the other group and connecting said receiving aperture to a second transmitting aperture of another core in said one group, whereby through energizing one or the other of said priming means information can be shifted in one direction or the other along said register.

5. The register in claim 4 wherein said coupling loop means includes a first coupling winding between each adjacent odd and even cores, and a second coupling winding between each adjacent odd and even cores.

6. The register in claim 4 wherein said coupling loop means includes a three-leg coupling winding linking a first transmitting aperture of a first core to the receiving aperture of a second core and to the second transmitting aperture of a third core.

7. A bi-directional multi-aperture magnetic core device comprising a plurality of cores arranged in odd and even groups, each core having a first and a second transmitting minor aperture and a receiving aperture, advance drive means for clearing the odd cores then the even cores and so on, first means for priming the first transmitting apertures of the cores, second means for priming the second transmitting apertures of the cores, and coupling loop means respectively connecting a first transmitting aperture of an odd core to a receiving aperture of an even core and connecting a second transmitting aperture of said odd core to a receiving aperture of another even core, said priming means bein independently energizable so that through energizing one or the other of said priming means information can be shifted in one direction or the other along said device.

References Cited by the Examiner

UNITED STATES PATENTS

| | | | |
|---|---|---|---|
| 2,911,628 | 11/1959 | Briggs | 340—174 |
| 2,968,795 | 1/1961 | Briggs | 340—174 |

IRVING L. SRAGOW, *Primary Examiner.*

JOHN F. BURNS, *Examiner.*